(12) United States Patent
Chen

(10) Patent No.: US 10,473,904 B2
(45) Date of Patent: Nov. 12, 2019

(54) SUNLIGHT MODULATION DEVICE WITH DIVERGENT REFLECTION OF CONVERGED SUNLIGHT FOR SOLAR ENERGY UTILIZATION

(71) Applicant: National Chiao Tung University, Hsinchu (TW)

(72) Inventor: Cheng-Huan Chen, Hsinchu (TW)

(73) Assignee: NATIONAL CHIAO TUNG UNIVERSITY, Hsinchu (TW)

( * ) Notice: Subject to any disclaimer, the term of this patent is extended or adjusted under 35 U.S.C. 154(b) by 0 days.

(21) Appl. No.: 16/125,220

(22) Filed: Sep. 7, 2018

(65) Prior Publication Data

US 2019/0004297 A1  Jan. 3, 2019

Related U.S. Application Data

(63) Continuation-in-part of application No. 15/010,526, filed on Jan. 29, 2016, now abandoned.

(30) Foreign Application Priority Data

Jan. 29, 2015 (TW) .............................. 104103089 A

(51) Int. Cl.
*G02B 19/00* (2006.01)
*G02B 3/08* (2006.01)
(Continued)

(52) U.S. Cl.
CPC ........... *G02B 19/0028* (2013.01); *A01G 7/00* (2013.01); *A01G 9/243* (2013.01); *F24S 23/31* (2018.05); *F24S 23/70* (2018.05); *F24S 23/79* (2018.05); *G02B 3/08* (2013.01); *G02B 5/26* (2013.01); *G02B 7/183* (2013.01); *G02B 19/0042* (2013.01); *H02S 40/22* (2014.12)

(58) Field of Classification Search
CPC ............ G02B 19/0028; G02B 19/0042; G02B 26/0816; G02B 3/08; G02B 7/183; G02B 5/26; F24S 23/00; F24S 23/79; F24S 23/31; F24S 23/70; A01G 9/1438; A01G 9/243; A01G 7/00; H02S 40/22
See application file for complete search history.

(56) References Cited

U.S. PATENT DOCUMENTS 4,108,157 A   8/1978 Gorniak
4,238,246 A  12/1980 Genequand et al.
(Continued)

FOREIGN PATENT DOCUMENTS

CN       101351715 A    1/2009
WO    WO 2011010940 A1  1/2011

*Primary Examiner* — Andrew Jordan
(74) *Attorney, Agent, or Firm* — Muncy, Geissler, Olds & Lowe, P.C.

(57) ABSTRACT

A sunlight modulation device includes a light focusing module and a light deflection module. The light focusing module is configured to let incident sunlight pass through and to converge direct sunlight of the incident sunlight. The light deflection module is configured to separate the converged direct sunlight from diffusion sunlight of the incident sunlight by reflecting the converged direct sunlight. The above-mentioned sunlight modulation device allows more diverse configurations for solar panels, heating devices or the like means, as well as illumination purpose.

19 Claims, 10 Drawing Sheets

(51) Int. Cl.
    *G02B 5/26*           (2006.01)
    *G02B 7/183*         (2006.01)
    *A01G 9/24*          (2006.01)
    *F24S 23/30*         (2018.01)
    *F24S 23/70*         (2018.01)
    *F24S 23/79*         (2018.01)
    *A01G 7/00*          (2006.01)
    *H02S 40/22*        (2014.01)

(56) References Cited

U.S. PATENT DOCUMENTS

| | | | |
|---|---|---|---|
| 4,324,227 A | 4/1982 | Mountain | |
| 4,909,626 A | 3/1990 | Purvis et al. | |
| 5,275,149 A | 1/1994 | Ludlow | |
| 5,339,198 A | 8/1994 | Wheatly et al. | |
| 5,444,559 A | 8/1995 | Warnar et al. | |
| 5,540,216 A | 7/1996 | Rasmusson | |
| 5,552,927 A * | 9/1996 | Wheatly | G02B 1/04 359/359 |
| 6,099,156 A | 8/2000 | Jenkins et al. | |
| 6,128,135 A | 10/2000 | Stiles et al. | |
| 6,177,966 B1 | 1/2001 | Masuda et al. | |
| 6,191,881 B1 | 2/2001 | Tajima | |
| 6,262,791 B1 | 7/2001 | Powell | |
| 6,398,988 B1 | 6/2002 | Jenkins et al. | |
| 6,691,701 B1 | 2/2004 | Roth | |
| 6,700,055 B2 | 3/2004 | Barone | |
| 6,717,045 B2 | 4/2004 | Chen | |
| 6,899,096 B2 | 5/2005 | Nakamura | |
| 6,934,072 B1 | 8/2005 | Kim et al. | |
| 6,934,073 B1 | 8/2005 | Kim et al. | |
| 7,077,523 B2 | 7/2006 | Seo et al. | |
| 7,136,227 B2 * | 11/2006 | Li | G02B 26/0808 359/573 |
| 7,640,931 B2 | 1/2010 | Tarabishi | |
| 7,642,450 B2 * | 1/2010 | Connor | H01L 31/0547 136/246 |
| 7,719,657 B2 | 5/2010 | Ooi et al. | |
| 7,975,685 B2 * | 7/2011 | Zhao | F21S 11/00 126/683 |
| 8,177,408 B1 | 5/2012 | Coleman | |
| 8,279,358 B2 * | 10/2012 | Chen | G03B 21/28 348/739 |
| 8,537,204 B2 | 9/2013 | Cho et al. | |
| 8,642,880 B2 | 2/2014 | Cheng et al. | |
| 8,681,291 B2 | 3/2014 | Takama et al. | |
| 8,687,276 B2 | 4/2014 | Cho et al. | |
| 8,689,784 B2 | 4/2014 | Monsebroten | |
| 8,705,914 B2 * | 4/2014 | Ghosh | F24S 23/79 385/31 |
| 8,988,781 B2 | 3/2015 | Chen et al. | |
| 9,065,371 B2 | 6/2015 | Hoffman | |
| 9,229,144 B2 | 1/2016 | Ghosh et al. | |
| 9,423,618 B2 * | 8/2016 | Petitdemange | G02B 27/0149 |
| 9,476,612 B2 | 10/2016 | Cwik et al. | |
| 9,709,829 B2 | 7/2017 | McGrew | |
| 9,864,261 B2 * | 1/2018 | Philipp | G03B 21/147 |
| 10,263,133 B2 * | 4/2019 | Tumminelli | H02S 40/22 |
| 2004/0231660 A1 | 11/2004 | Nakamura | |
| 2005/0011513 A1 * | 1/2005 | Johnson | F24S 20/20 126/698 |
| 2005/0092360 A1 | 5/2005 | Clark | |
| 2005/0179868 A1 | 8/2005 | Seo et al. | |
| 2006/0007301 A1 | 1/2006 | Cho et al. | |
| 2006/0028728 A1 | 2/2006 | Li | |
| 2007/0137640 A1 | 6/2007 | Tarabishi | |
| 2007/0146625 A1 * | 6/2007 | Ooi | G02B 3/08 349/200 |
| 2008/0087276 A1 | 4/2008 | Zhao | |
| 2008/0092877 A1 | 4/2008 | Monsebroten | |
| 2008/0106806 A1 | 5/2008 | Hendriks et al. | |
| 2008/0236569 A1 | 10/2008 | Tuccio | |
| 2008/0264716 A1 | 10/2008 | Kuiper et al. | |
| 2009/0252019 A1 | 10/2009 | Chen et al. | |
| 2010/0006088 A1 | 1/2010 | Campbell et al. | |
| 2010/0012171 A1 | 1/2010 | Ammar | |
| 2010/0175685 A1 | 7/2010 | Campbell et al. | |
| 2010/0182516 A1 | 7/2010 | Chen et al. | |
| 2010/0229648 A1 | 9/2010 | Suijver et al. | |
| 2010/0319773 A1 | 12/2010 | West et al. | |
| 2011/0056530 A1 | 3/2011 | Chang | |
| 2011/0069254 A1 | 3/2011 | Takama et al. | |
| 2011/0083741 A1 * | 4/2011 | Munro | G02B 27/1006 136/259 |
| 2011/0083742 A1 * | 4/2011 | Munro | G02B 27/1006 136/259 |
| 2011/0100418 A1 * | 5/2011 | Maeda | F24S 23/77 136/246 |
| 2011/0181955 A1 | 7/2011 | Cho et al. | |
| 2011/0259396 A1 * | 10/2011 | Hoffman | H01L 31/052 136/246 |
| 2011/0267570 A1 | 11/2011 | Saito et al. | |
| 2012/0099325 A1 * | 4/2012 | Ghosh | F24S 23/79 362/296.01 |
| 2012/0228883 A1 | 9/2012 | Cwik et al. | |
| 2013/0008487 A1 * | 1/2013 | Cheng | H01L 31/0547 136/248 |
| 2013/0128334 A1 * | 5/2013 | Stephen | G02F 1/01 359/279 |
| 2014/0268809 A1 * | 9/2014 | Ghosh | F24S 23/79 362/307 |
| 2015/0029594 A1 | 1/2015 | Chen et al. | |
| 2015/0268472 A1 | 9/2015 | Petitdemange et al. | |
| 2015/0318818 A1 * | 11/2015 | Hoffman | H01L 31/052 136/246 |
| 2016/0187765 A1 | 6/2016 | Philipp | |
| 2016/0223802 A1 | 8/2016 | Chen | |
| 2019/0245106 A1 * | 8/2019 | Tumminelli | H02S 40/22 |

* cited by examiner

SUNLIGHT MODULATION DEVICE WITH DIVERGENT REFLECTION OF CONVERGED SUNLIGHT FOR SOLAR ENERGY UTILIZATION

CROSS-REFERENCE TO RELATED APPLICATION

This application is a continuation-in-part of U.S. patent application Ser. No. 15/010,526, filed Jan. 29, 2016, and entitled "SUNLIGHT MANIPULATING DEVICE." This application claims priority of Application No. 104103089 filed in TAIWAN on Jan. 29, 2015 under 35 U.S.C. § 119. The aforementioned related applications are hereby incorporated by reference in their entirety.

BACKGROUND OF THE INVENTION

1. Field of the Invention

The present invention relates to a light modulation device, and more particularly to a sunlight modulation device for illumination and energy generation.

2. Description of the Prior Art

Solar energy belongs to clean energy and inexhaustible, and therefore how to effectively utilize solar energy is the main development direction of industry. At present, the major application of solar energy includes generating electric power, heating or illuminating. In order to effectively utilize solar energy, conventional solar equipment is mostly set in space in direct sunlight, i.e. setting in outdoors.

There are main two classifications for solar equipment. One type is a photovoltaic system equipped with a solar array of solar panels to absorb and convert sunlight into electricity, a solar inverter to change the electric current from DC to AC, as well as mounting, cabling, and other electrical accessories to set up a working system. Such a solar array of solar panels receive sunlight without concentration, and life of solar panel setting in outdoors may be shortened due to climatic factors. Another type is a concentrator photovoltaics (CPV), which is also known as Concentration Photovoltaics and uses lenses and curved mirrors to focus sunlight onto small, but highly efficient, multi-junction (MJ) solar cells. Despite concentrator photovoltaic with multi-junction solar cell of high efficiency, however, photovoltaic system with solar panel is more popular all over the world because of other factors.

However, most of the conventional solar panel is set in facing the sun with large area manner to facilitate absorbing solar energy. Such a solar panel installation shadows the most sunlight so as not to allow scattering sunlight radiation (also named as or referred to diffusion sunlight radiation) to the area behind the solar panel. To move the solar panel with large area is another way to allow sunlight radiation to the area behind the solar panel, but it is not easy to move such a huge device. Besides, in the case that the power consumption for illumination is greater than the amount of power generation by solar energy, the introduction of sunlight for illumination is obviously better for energy utilization. After all, the process of photo-to-electron and then electron-to-photo energy transformation for artificial lighting should be avoided as possible because energy transformation always includes some efficiency loss.

For consideration on applying sunlight to illumination for people or plant, direct sunlight is generally so strong to make people feel glaring and plant be withered quickly. Moreover, in the case that direct sunlight penetrates through a shelter or space between shelters to reach to a zone under the shelter or shelters, it generally cause obvious light beam of brightness higher than surrounding of the zone, which is also not suitable for growth of plant positioned on the zone and people.

Accordingly, it is highly desirable to manipulate the sunlight to efficiently use solar energy.

SUMMARY OF THE INVENTION

The present invention is directed to a sunlight modulation device including a light focusing module and a light deflection module. The cooperation of the light focusing module and the light deflection module may separate direct radiation and diffusion radiation of sunlight, so that the separated direct radiation and diffusion radiation may be applied for energy generation and illumination purpose, respectively.

The present invention is directed to a sunlight modulation device including a light focusing module and a light deflection module. The size and/or shape of the light deflection module may control the amount of diffusion sunlight to pass through to illuminate an area. Most direct sunlight can be directed by the light deflection module to a target area for installation of panel type solar cell and/or heating device.

Accordingly, the proposed sunlight modulation device includes a light focusing module configured to let incident sunlight pass through and to converge direct sunlight of the incident sunlight; and a light deflection module configured to separate the converged direct sunlight from diffusion sunlight of the incident sunlight by reflecting the converged direct sunlight.

Accordingly, a sunlight modulation device includes: a light focusing module configured to let incident sunlight pass through and to converge direct sunlight of the incident sunlight on a focal region; and a light deflection module arranged on the focal region or adjacent to the focal region, wherein the light deflection module is configured to divergently reflect the converged direct sunlight to a target area and to control, with at least one of size and shape thereof, amount of diffusion sunlight of the incident sunlight to illuminate an area underneath the light focusing module.

The objective, technologies, features and advantages of the present invention will become apparent from the following description in conjunction with the accompanying drawings wherein certain embodiments of the present invention are set forth by way of illustration and example.

BRIEF DESCRIPTION OF THE DRAWINGS

The foregoing conceptions and their accompanying advantages of this invention will become more readily appreciated after being better understood by referring to the following detailed description, in conjunction with the accompanying drawings, wherein.

DESCRIPTION OF THE PREFERRED EMBODIMENT

Various embodiments of the present invention will be described in detail below and illustrated in conjunction with the accompanying drawings. In addition to these detailed descriptions, the present invention can be widely implemented in other embodiments, and apparent alternations, modifications and equivalent changes of any mentioned embodiments are all included within the scope of the present invention and based on the scope of the Claims. In the descriptions of the specification, in order to make readers have a more complete understanding about the present invention, many specific details are provided; however, the present invention may be implemented without parts of or all the specific details. In addition, the well-known steps or elements are not described in detail, in order to avoid unnecessary limitations to the present invention. Same or similar elements in Figures will be indicated by same or similar reference numbers. It is noted that the Figures are schematic and may not represent the actual size or number of the elements. For clearness of the Figures, some details may not be fully depicted.

Figure 1:
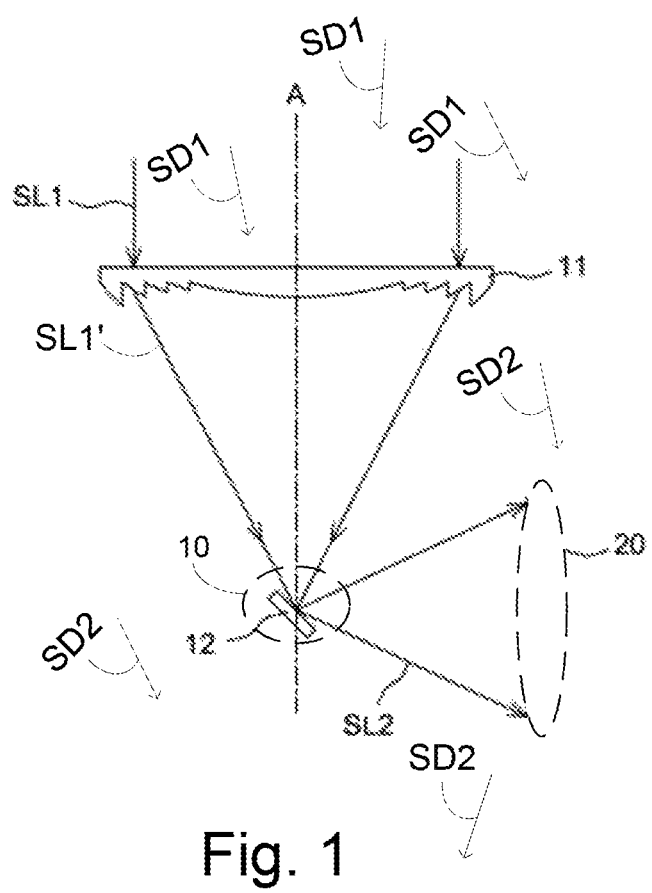
FIG. 1 is a diagram schematically illustrating a sunlight modulation device according to the first embodiment of the present invention.

Referring to FIG. 1, a sunlight modulation device according to the first embodiment of the present invention is provided with a light focusing module 11 and a light deflection module 12. Generally, incident sunlight includes direct radiation and diffusion radiation. The direct radiation is also named as direct sunlight SL1, and the diffusion radiation is also named as diffusion sunlight SD1. The light focusing module 11 can converge direct sunlight SL1 on a focal region 10. Direct sunlight SL1 radiated from the sun (not shown) may pass through the light focusing module 11 to be focused within a focal region 10. In the first embodiment, the light focusing module 11 may be a Fresnel lens, but is not limited thereto. Other lenses having the function of converging light can implement the present invention. Furthermore, the sunlight passing through the light focusing module 11 may be focused into a point or a line within the focal region 10 by the light focusing module 11. Next, the light deflection module 12 is arranged on the focal region 10 or adjacent to the focal region 10 converging the sunlight and reflects the converged sunlight SL1 to form divergently reflecting sunlight SL2 to a target area 20. The target area 20 is diverged from an optical axis A of the light focusing module 11. In one embodiment, the light deflection module 12 may be a reflective element or a refractive element. In the embodiment shown in FIG. 1, the light deflection module 12 is a reflective element. It can be understood that the light deflection module 12 may be a single optical element which includes a plurality of reflecting surfaces or refractive surfaces. For example, the light deflection module 12 may be a prism. It is noted that the position of the sun changes over time and the focal region 10 may move depending on the movement of the sun, too. Therefore, in one embodiment, the size or moveable path of the light deflection module 12 covers a movement trajectory of the focal region 10 caused by movement of the sun.

Referring to FIG. 1 again, in one embodiment, a light entrance surface of a solar panel or a heating device (not shown) can be installed at the target area 20 to utilize the reflecting sunlight SL2 from the light deflection module 12. The reflecting sunlight SL2 According to the embodiment shown in FIG. 1, the installation of solar panel and/or heating device can be more flexible by using the sunlight modulation device of the present invention to adjust the light path of the direct sunlight SL1. For example, the solar panel can be installed at a sheltered environment so that the damage of solar panel caused by wind, rain or other climatic factors can be avoided and the operating life of solar panel can be extended. In addition, the solar panel may be installed in erected manner to reduce the space required for the installation of solar panel and/or heating device. Moreover, compared to the converged direct sunlight SL1', the reflecting sunlight SL2 may more divergently spread so that the solar panel and/or heating device at the target area 20 may be of large height but occupy little horizontal area. Thus, most direct sunlight incident into the sunlight modulation device of the present invention may be utilized by solar panel or heating device.

Referring to FIG. 1 again, the diffusion sunlight SD1 passes through the light focusing module 11 to be named as diffusion sunlight SD2. The diffusion sunlight SD2 may further pass though the light deflection module 12 to reach to an area underneath the light focusing module 11. The diffusion sunlight SD2 may be used to illuminate the area underneath the light focusing module 11. Accordingly, the light deflection module 12 is configured to separate the converged direct sunlight SL1 from the diffusion sunlight SD1 of the incident sunlight by reflecting the converged direct sunlight SL1.

Figure 2A:
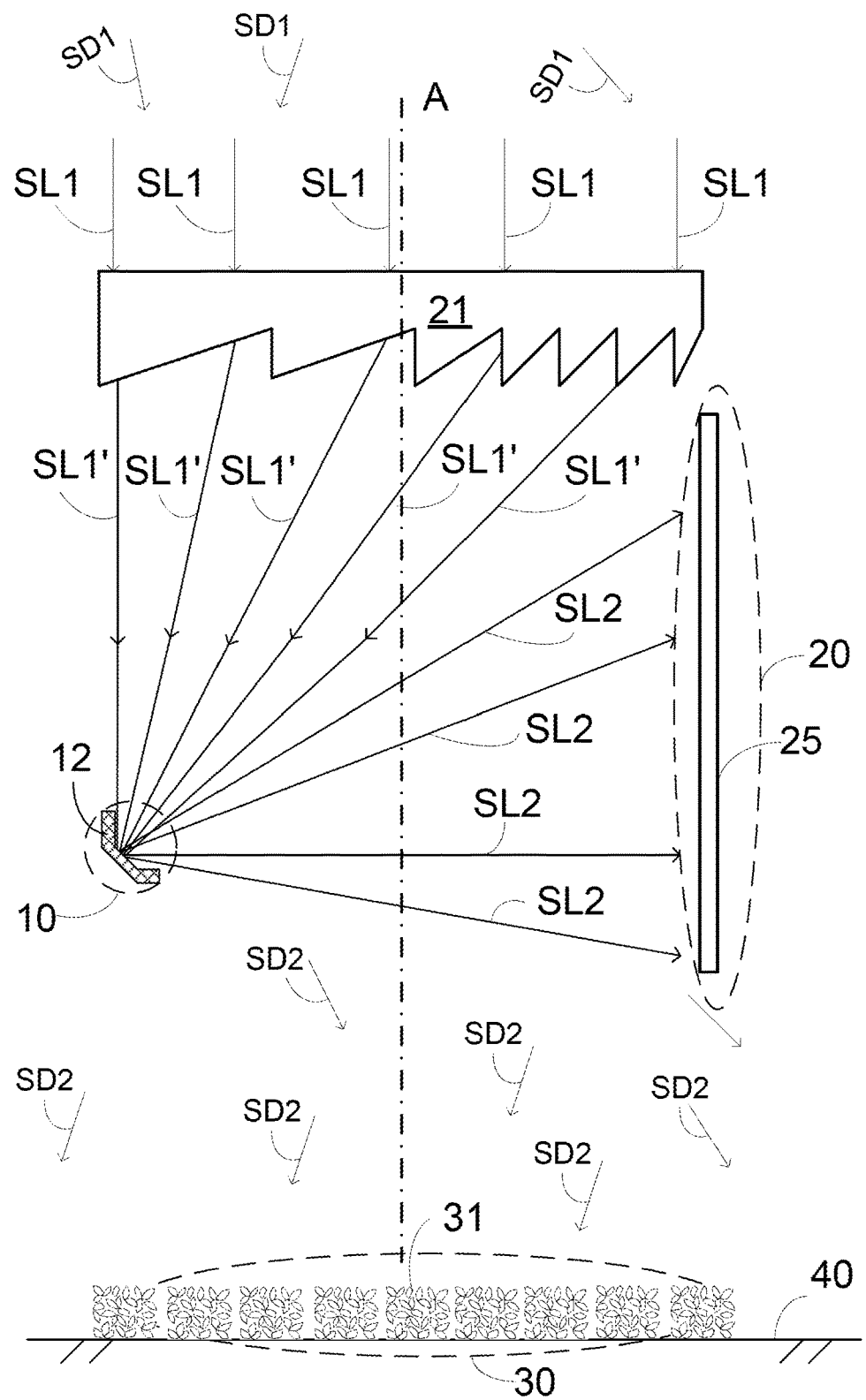
FIG. 2a is a diagram schematically illustrating a sunlight modulation device of one state in one of seasons according to the second embodiment of the present invention.
Figure 2B:
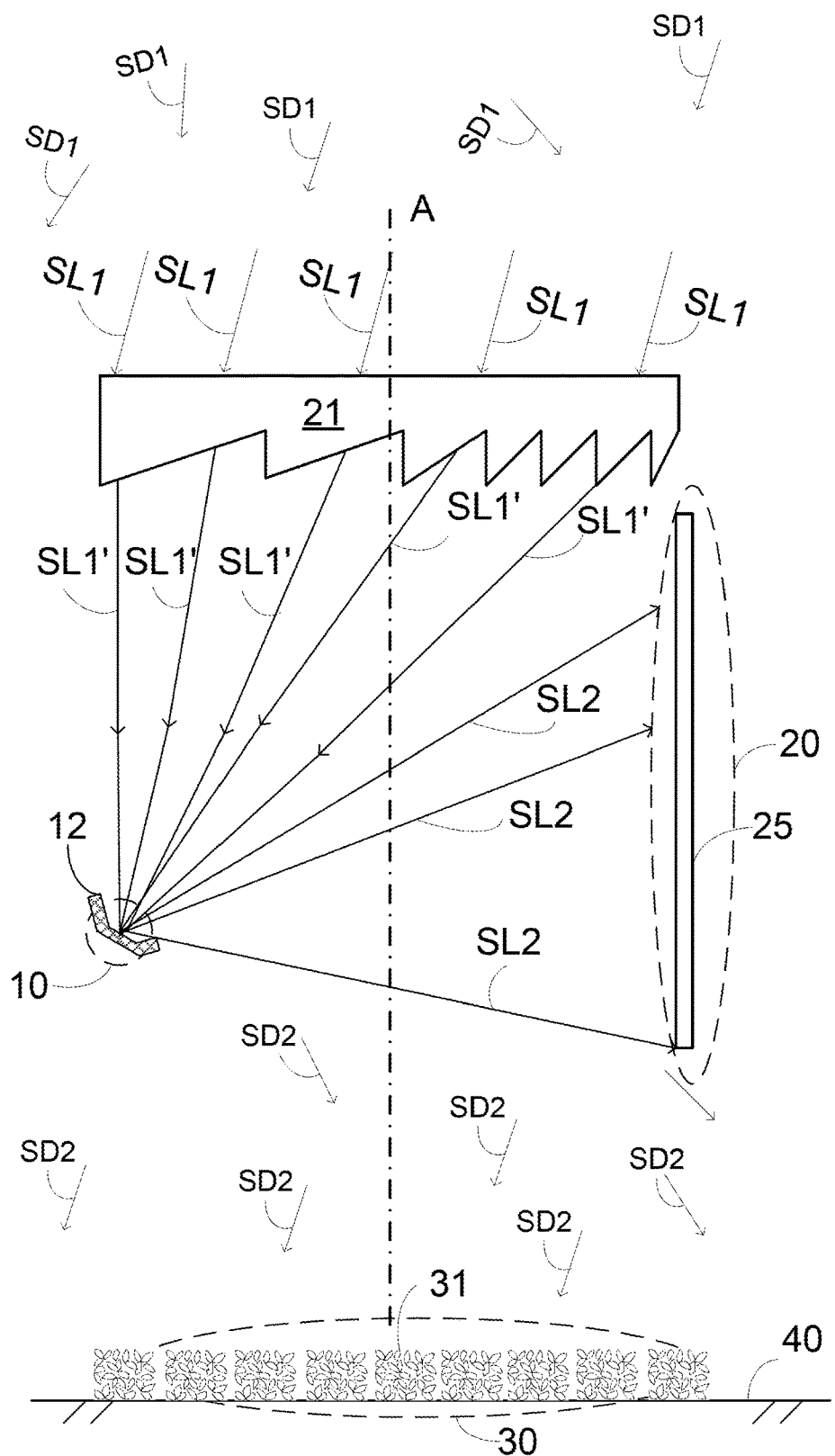
FIG. 2b is a diagram schematically illustrating a sunlight modulation device of another state in another one of seasons according to the second embodiment of the present invention.

Referring to FIG. 2a and FIG. 2b illustrate the sunlight modulation device in one and another situations according to the second embodiment. The light focusing module includes a linear Fresnel lens 21 to receive incident direct sunlight SL1 and incident diffusion sunlight SD1. The incident direct sunlight SL1 incidents on one side of the linear Fresnel lens 21 and passes through the linear Fresnel lens 21 to form direct sunlight SL1' on the other side of the linear Fresnel lens 21. In the second embodiment, people or plant 31 on ground 40 are located under the linear Fresnel lens 21 and on the other side of the linear Fresnel lens 21, as well as the direct sunlight SL1' and the diffusion sunlight SD2. Because of good transmittance of the linear Fresnel lens 21, diffusion sunlight SD2 may reach to and distribute on the other side of the linear Fresnel lens 21 where the plant 31 locates or people live. Next, the light deflection module 12 with multi reflecting surfaces in different angles is deposited on or within the focal region 10 to reflect the direct sunlight SL1' to form the reflecting sunlight SL2. The reflecting sunlight SL2 may reach to the target area 20 where one or more solar panels 25 are mounted, so that the solar panels 25 may utilize the reflecting sunlight SL2 without concentration.

Referring to FIG. 2a, the light deflection module 12 deposited right on focal points or lines of the focal region 10 or within the focal region 10 can reflect most of the direct sunlight SL1' with smaller sizes, and most of diffusion sunlight SD2 can not be sheltered by the light deflection module 12 under the linear Fresnel lens 21. On the other hand, most of diffusion sunlight SD2 under the linear Fresnel lens 21 can reach to the ground 40 and provide an illumination area 30 for people and/or the plant 31. Accordingly, the cooperation of the linear Fresnel lens 21 and the light deflection module 12 may respectively utilize the direct sunlight SL1' and the diffusion sunlight SD2 in different applications like photovoltaic generation of the solar panels 25 and the illumination of the plant 31 or people. Moreover, the brightness of the illumination area 30 is uniform and not glare due to the diffusion sunlight SD2.

On the other hand, please refer to FIG. 2b, the light deflection module 12 with multi reflecting surfaces in different angles may be tilted to be arranged in different seasons. In the case that the direct sunlight SL1 is incident onto the linear Fresnel lens 21 with different incident angles in different seasons, the direct sunlight SL1' is incident onto the light deflection module 12 with different incident angles, too. The light deflection module 12 of the second embodiment may be arranged, of different angles or of shapes or dimensions, to receive the converged direct sunlight SL1' and then to reflect the direct sunlight SL1' to the target area 20. On the other hand, the diffusion sunlight SD2 still pass through the light deflection module 12 to irradiate the illumination area 30. Accordingly, the light deflection module 12 in designed dimension or with adjustable directions may be adaptive to the direct sunlight SL1' that is converged to the focal region 10 in different seasons. The size and/or shape of the light deflection module 12 is also used to control amount of the diffusion sunlight SD2 passing through the light deflection module 12 to illuminate the illumination area 30 underneath the linear Fresnel lens 21. Next, the light deflection module 12 with multi reflecting flat or curved surfaces in different angles may be provided with one-piece component or connection or consisting of different separating members or parts that have reflection function.

Accordingly, compared to a typical design for energy transformation of the sunlight, the installation of the sunlight modulation device of the present invention does not shadow the radiation of the sunlight onto the area behind the sunlight modulation device, and the area behind the sunlight modulation device may be still illuminated by the sunlight that passes through the sunlight modulation device of the present invention. On one hand, the sunlight modulation device of the present invention may provide diffusion sunlight for direct illumination, which does not necessitate the process of photo-to-electron and then electron-to-photo energy transformation. On the other hand, the sunlight modulation device of the present invention may deflect and spread direct sunlight to provide sunlight onto the solar panel or other equipment without the addition of foot print of the solar panel or other equipment.

Figure 3:
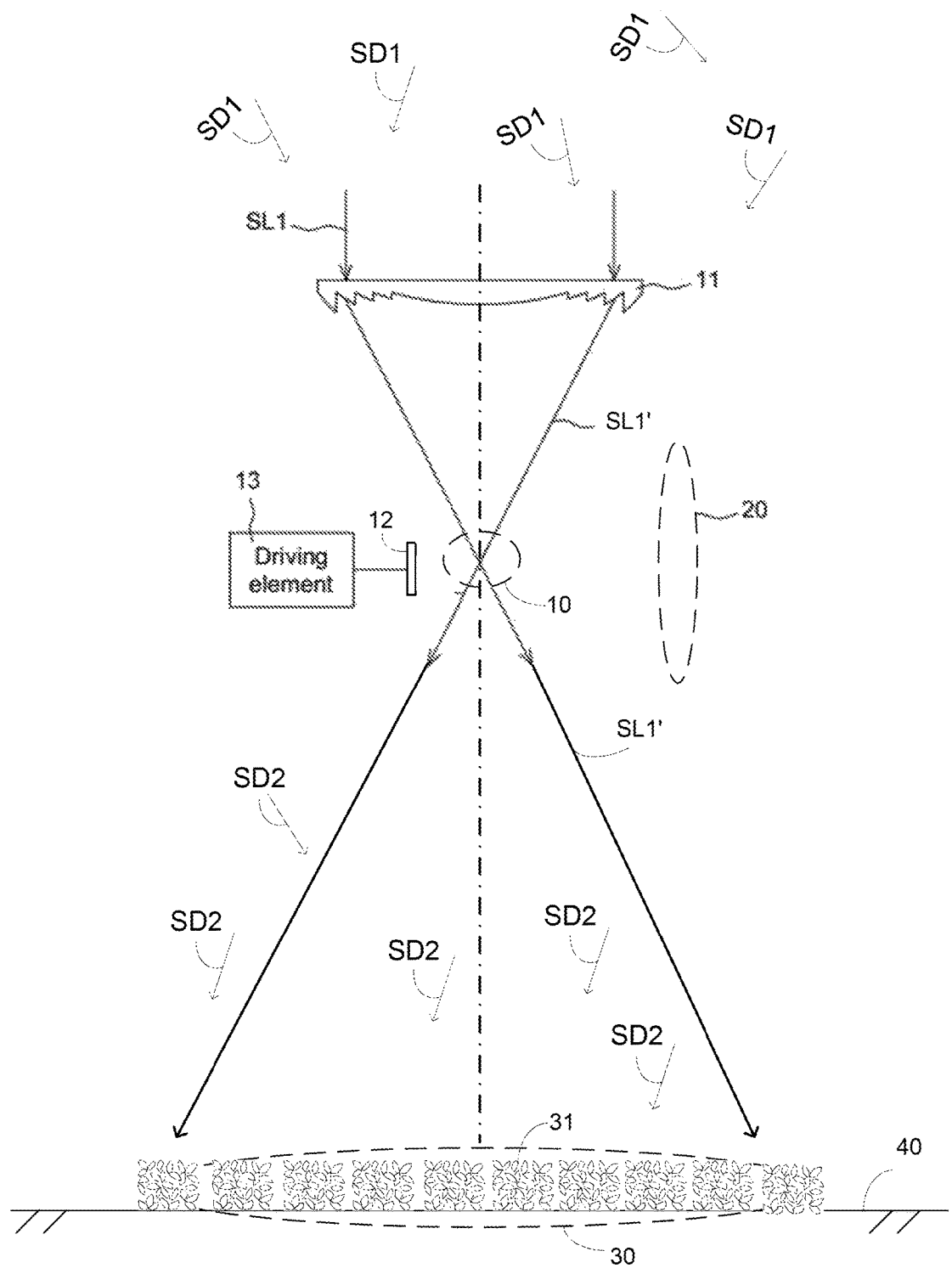
FIG. 3 is a diagram schematically illustrating a sunlight modulation device according to the third embodiment of the present invention.
Figure 4:
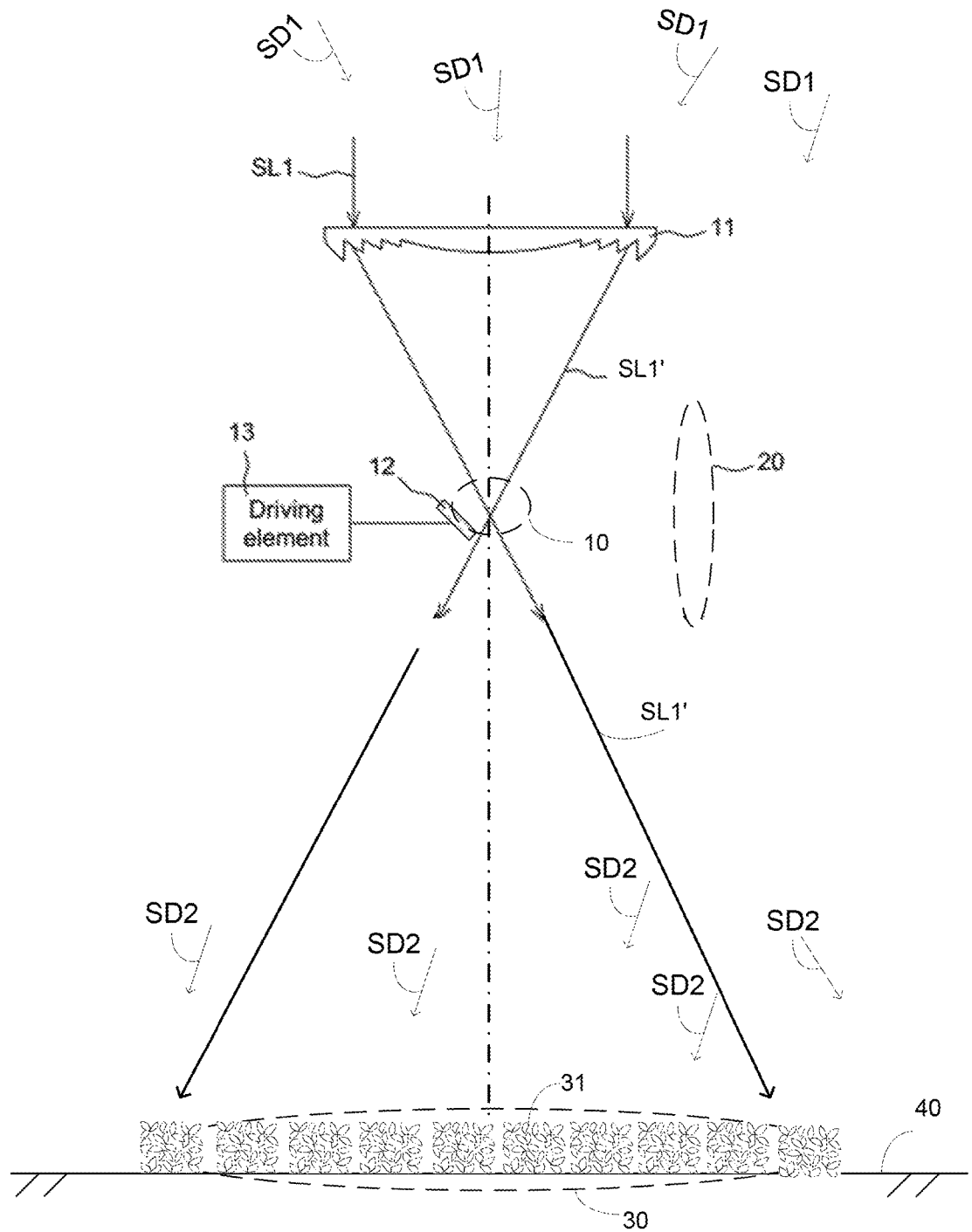
FIG. 4 is a diagram schematically illustrating a sunlight modulation device according to the fourth embodiment of the present invention.

FIG. 3 and FIG. 4 respectively illustrate the sunlight modulation device of the third embodiment and fourth embodiment of the present invention. Please refer to FIG. 3 and FIG. 4, a driving element 13 is connected with the light deflection module 12 to drive the light deflection module 12 in a manner of rotation (as shown in FIG. 3), linear movement (as shown in FIG. 4) or the combination thereof. In the case that the light deflection module 12 is driven by the driving element 13 to be diverged from the focal region 10, instead of being deflected to the target area 20 by the light deflection module 12, the converged direct sunlight SL1' from the light focusing module 11 passes by the focal region 10 to irradiate the illumination area 30, in addition to the diffusion sunlight SD2. It can be understood that part of the light deflection module 12 diverges from the focal region 10 so that part of the converged direct sunlight SL1' is reflected to form the reflecting sunlight SL2 to be directed to the target area 20 for illumination purposes.

Figure 5:
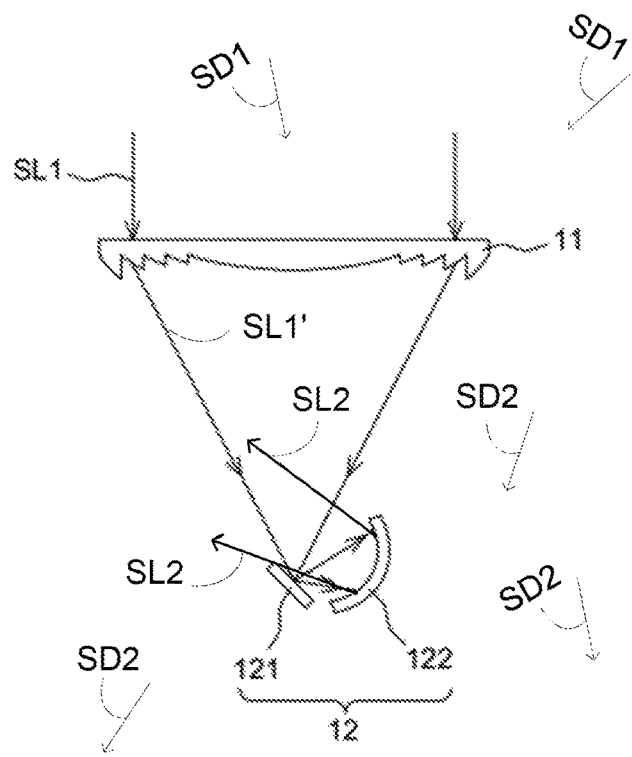
FIG. 5 is a diagram schematically illustrating a sunlight modulation device according to the fifth embodiment of the present invention.

FIG. 5 shows the sunlight modulation device according to the fifth embodiment of the present invention. In the fifth embodiment, the light deflection module 12 of the fifth embodiment includes a plurality of optical elements 121, 122. As shown in FIG. 5, the optical element 122 includes a curved surface to adjust diverging extent of the converged direct sunlight that is reflected by the optical element 122. Alternatively, the light deflection module 12 including a single optical element with curved surface is also able to implement the function of further converging the sunlight SL2.

Figure 6:
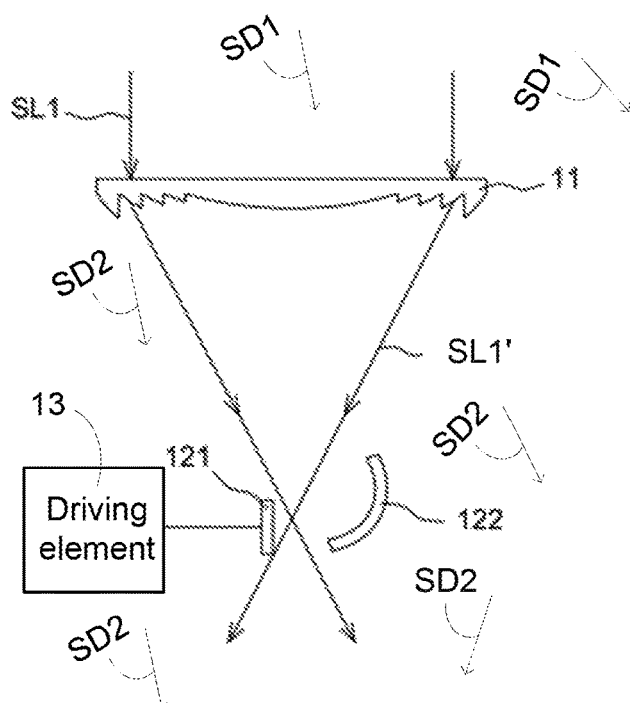
FIG. 6 is a diagram schematically illustrating a sunlight modulation device according to the sixth embodiment of the present invention.

FIG. 6 shows the sunlight modulation device according to the sixth embodiment of the present invention. Compared to the fifth embodiment shown in FIG. 5, the sixth embodiment further includes a driving element 13 connected with the optical element 121 of the light deflection module 12. Similar to ones shown in FIG. 3 and FIG. 4, the driving element 13 is configured to drive the optical element in rotation or linear movement manner to make the optical element 121 diverge from the focal region of the light focusing module 11, so that the converged sunlight SL1' passing through the focal region will diffuse for the illumination purpose. It can be understood that the same purpose can be achieved by driving the light deflection module 12 including the optical elements 121, 122 to diverge from the focal region of the light focusing module 11 by the driving element 13. In one embodiment, the driving element 13 may drive the optical element 121 in rotation manner to make the direct sunlight SL1' converged by the light focusing module 11 deflect to other direction for irradiating a wider range of the target area 20, instead of deflecting to the optical element 122.

Figure 7A:
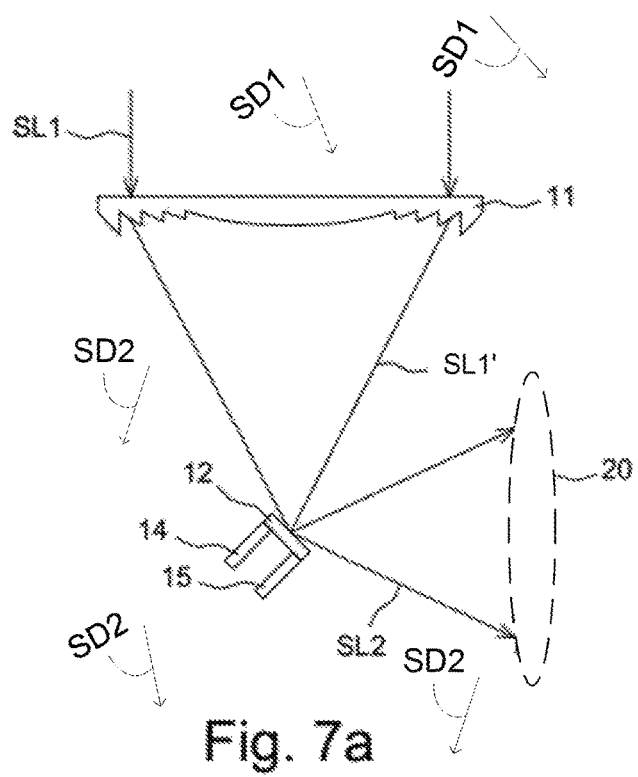
FIG. 7a and FIG. 7b are diagrams schematically illustrating a sunlight modulation device according to the seventh embodiment of the present invention.
Figure 7B:
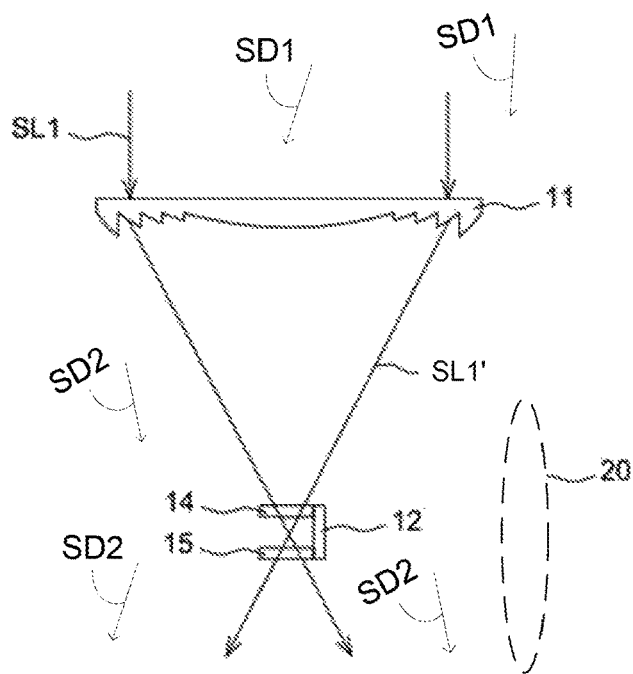

Next, shown in FIG. 7a and FIG. 7b, the seventh embodiment further includes at least one of a filter element 14 and a scattering element 15. The filter element 14 and the scattering element 15 may be driven by the driving element (not shown in FIG. 7a and FIG. 7b) to selectively move to the focal region or adjacent to the focal region in linear movement or rotation manner. According to the foregoing structure, for example as the illumination purpose, the filter element 14 or the scattering element 15 can be moved to the focal region to filter or scatter the converged direct sunlight SL1' to achieve better illumination effects.

Figure 8:
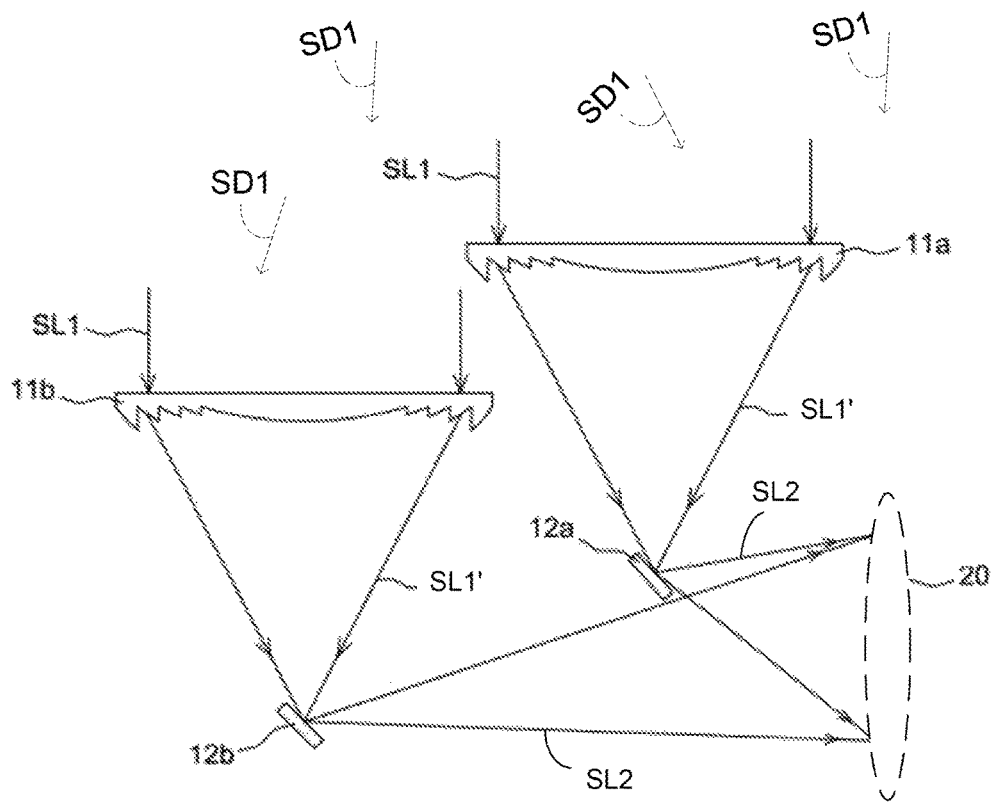
FIG. 8 is a diagram schematically illustrating a sunlight modulation device according to the eighth embodiment of the present invention.
Figure 8:
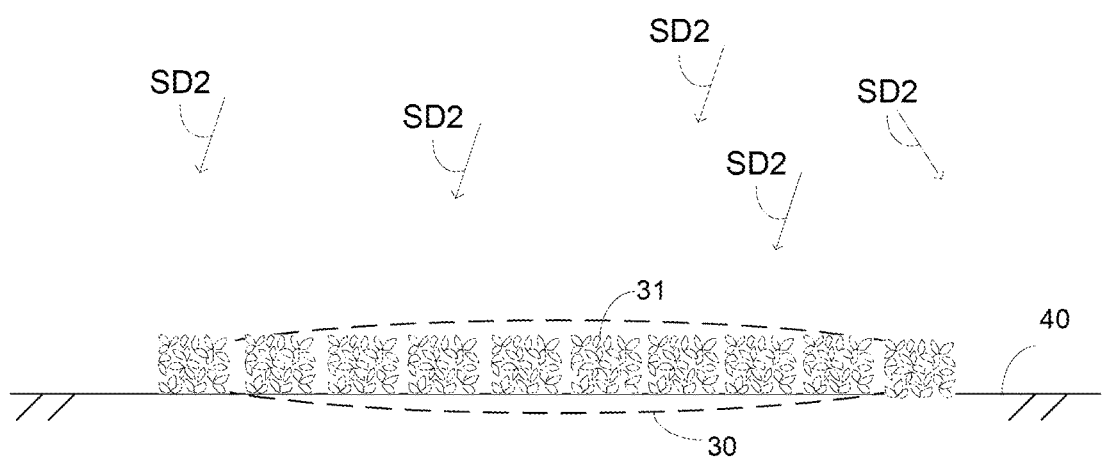

Next, shown in FIG. 8, plural light focusing modules and light deflection modules are used in the eighth embodiment. The light focusing module 11a is corresponded with the light deflection module 12a, and the light focusing module 11b is corresponded with the light deflection module 12b. Furthermore, the plural light focusing modules and the light deflection modules may reflect the converged sunlight SL1' to form the reflecting sunlight SL2 on the same target area 20. According to this structure, more sunlight can be obtained per unit area of the target area 20.

Figure 9:
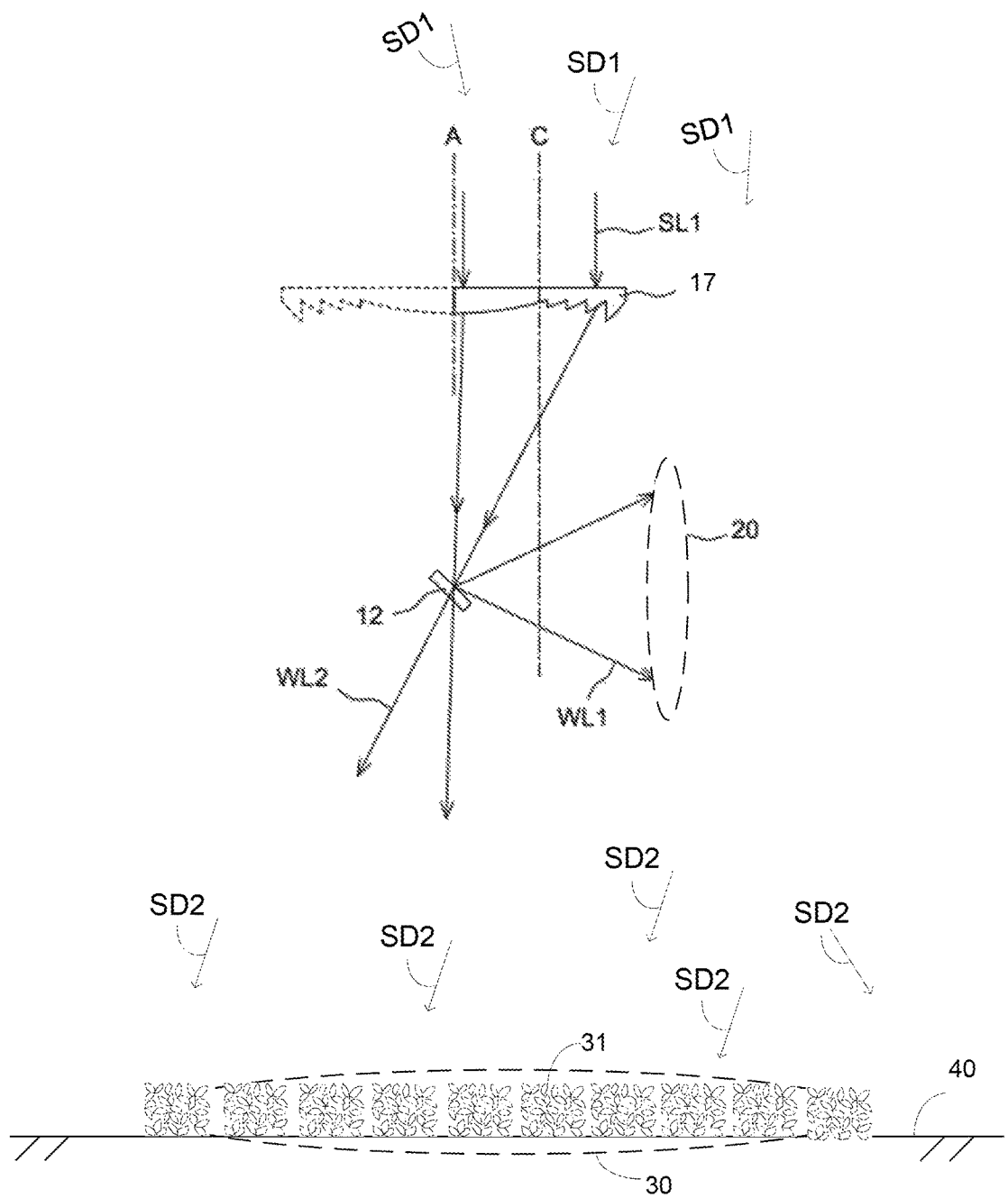
FIG. 9 is a diagram schematically illustrating a sunlight modulation device according to the ninth embodiment of the present invention.

Next, shown in FIG. 9, the light focusing module 17 is an asymmetric focusing optical element. Briefly, the focal region of the light focusing module 17 is diverged from a physical center axis C of the light focusing module 17. Therefore, the setting position of the light deflection module 12 is diverged from the physical center axis C of the light focusing module 17, which improve the installation of the light focusing module 12 be more flexible.

Referring to FIG. 9 again, in one embodiment, the light deflection module 12 may be a reflective filter. In other words, a first light WL1 of a first wavelength range among the converged sunlight can be deflected to the target area 20 by the light deflection module 12, and a second light WL2 of a second wavelength range among the converged sunlight transmits through the light deflection module 12. According to this structure, the second light WL2 can be used for illumination or irradiating plant to promote plant growth or people, and the first light WL1 can be for generating electric power or heating. It can be understood that the first light WL1 irradiating to the target area 20 may not be used for any purpose.

Figure 10:
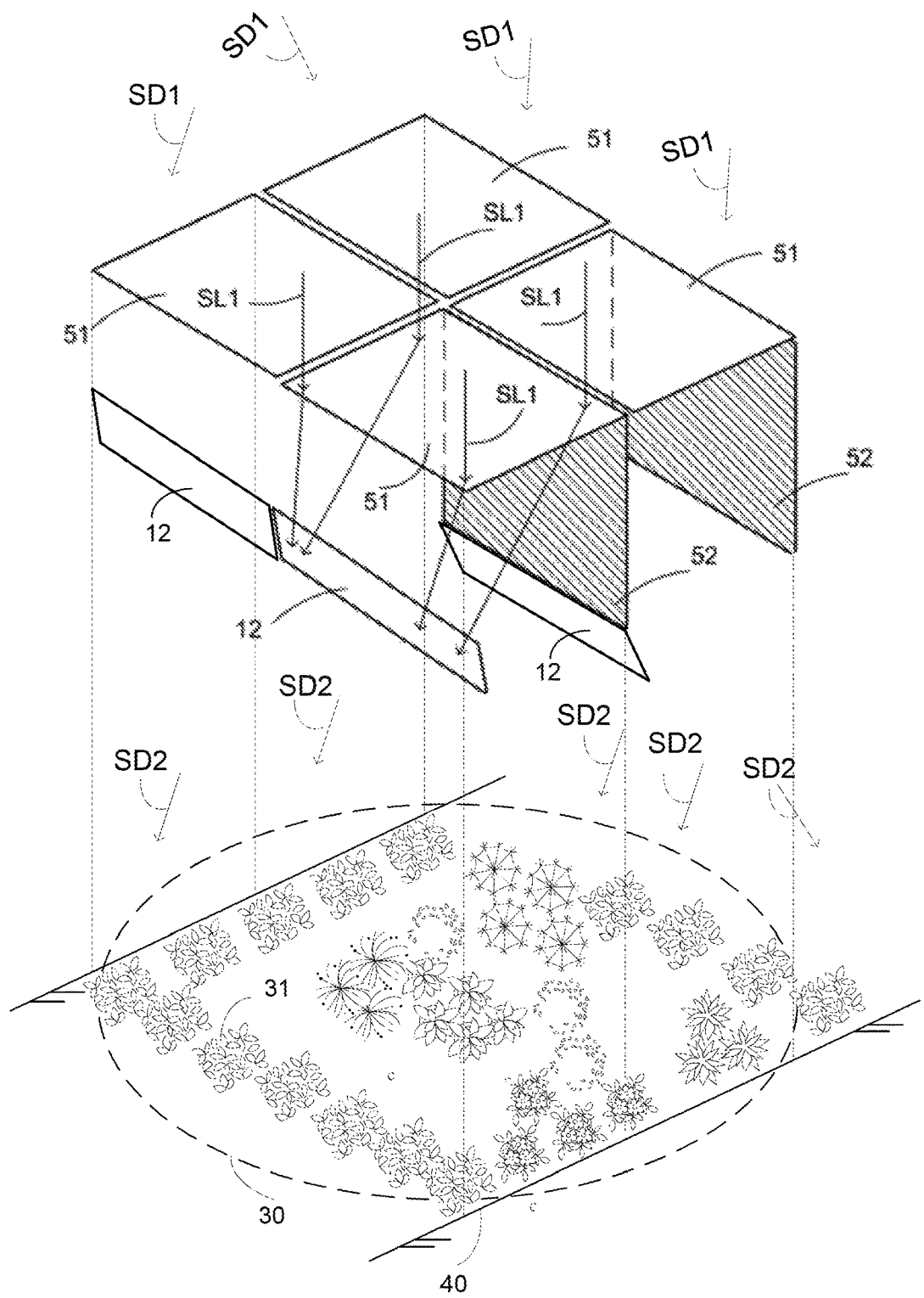
FIG. 10 is a perspective side-view diagram schematically illustrating a sunlight modulation device according to the present invention.

FIG. 10 is a perspective side-view diagram schematically illustrating component arrangement for a sunlight modulation device according to the present invention. In one embodiment, one or more linear Fresnel lenses 51 are used as the light focusing module to pass and converge the direct sunlight SL1 in one dimension. One or more light deflection modules 12 are arranged on the focal region or adjacent to the focal region converging the sunlight SL1. The illumination area 30 for plant 31, people or animals is underneath the linear Fresnel lenses 51, and the solar panels 52 at the target area are positioned vertical to the linear Fresnel lenses 51 and arranged with a distance equal to the width of the linear Fresnel lens 51. The area of the solar panels 52 may be larger than the area of the linear Fresnel lenses 51 to receive the reflected sunlight divergently reflected by the light deflection module 12. In practice, the incident angles of the direct sunlight SL1 onto the linear Fresnel lenses 51 vary not only in a day but also in different seasons. Without designs for solar tracking, the back of the solar panels 52 may be coated reflecting material for the reflection of the oblique direct sunlight SL1 when the direct sunlight SL1 is still oblique after focused by the linear Fresnel lenses 51 to be reflected by the light deflection modules 12. Accordingly, the reflecting back of the solar panels 52 may be used as a part of the light deflection module 12 when plural solar panels 52 are positioned in suitable arrangement. The sunlight modulation device shown in FIG. 10 may enable the focused line of the direct sunlight SL1 on the light deflection module 12 move along the plural light deflection modules 12 in a day or in different seasons. Consequently, the variation in different incident directions due to different seasons and the quality of focused line shapes due to oblique incident may be resolved in the present invention. The sunlight modulation device of the present invention may be installed as roof of building for people or greenhouse for plant.

To summarize the foregoing descriptions, the sunlight modulation device of the present invention uses the light focusing module and the light deflection module to adjust the light path of the incident sunlight and guide the sunlight to the target area, so that the installation of solar panel and/or heating device can be more flexible, such as in a sheltered environment or erected installation. In addition, the light path of the incident sunlight can be changed by controlling the light focusing module or the light deflection module so as to selectively adjust the application of the sunlight.

While the invention is susceptible to various modifications and alternative forms, a specific example thereof has been shown in the drawings and is herein described in detail. It should be understood, however, that the invention is not to be limited to the particular form disclosed, but to the contrary, the invention is to cover all modifications, equivalents, and alternatives falling within the scope of the appended claims.

What is claimed is:

1. A sunlight modulation device comprising:
a light focusing module configured to let incident sunlight pass through and to converge direct sunlight of the incident sunlight; and
a light deflection module configured to separate the converged direct sunlight from diffusion sunlight of the incident sunlight by reflecting the converged direct sunlight, wherein a size and/or a shape of the light deflection module is used to control amount of the diffusion sunlight passing through the light deflection module to illuminate an area underneath the light deflection module, and the converged direct sunlight reflected by the light deflection module is divergently directed to a target area.

2. The sunlight modulation device according to claim 1, wherein the converged direct sunlight is converged on a focal region and the light deflection module is arranged on or adjacent to the focal region.

3. The sunlight modulation device according to claim 1, wherein the light focusing module comprises one or more Fresnel lenses.

4. The sunlight modulation device according to claim 1, wherein the light deflection module comprises a flat or curved reflecting surface.

5. The sunlight modulation device according to claim 1, wherein the light deflection module comprises plural flat and/or curved reflecting surfaces, and the flat and/or curved reflecting surfaces are connected together or separated.

6. The sunlight modulation device according to claim 5, wherein the curved reflecting surfaces adjust diverging extent of the converged direct sunlight that is reflected by the curved reflecting surfaces.

7. A sunlight modulation device comprising:
a light focusing module configured to let incident sunlight pass through and to converge direct sunlight of the incident sunlight on a focal region; and
a light deflection module arranged on the focal region or adjacent to the focal region, wherein the light deflection module is configured to divergently reflect the converged direct sunlight to a target area and to control, with at least one of size and shape thereof, amount of diffusion sunlight of the incident sunlight to illuminate an area underneath the light focusing module.

8. The sunlight modulation device according to claim 7, wherein the light focusing module comprises one or more linear Fresnel lenses.

9. The sunlight modulation device according to claim 7, wherein the focal region comprises a focal point or focal line.

10. The sunlight modulation device according to claim 7, wherein a size or a moveable path of the light deflection module covers a movement trajectory of the focal region caused by movement of the sun in a day or in different seasons.

11. The sunlight modulation device according to claim 7, wherein the light deflection module comprises a reflective element or a reflective filter.

12. The sunlight modulation device according to claim 7, wherein the light deflection module comprises plural flat or curved reflecting surfaces, and the plural flat or curved reflecting surfaces are connected together or separated.

13. The sunlight modulation device according to claim 12, wherein the plural curved reflecting surfaces modulate a diverging extent of the converged direct sunlight that is reflected by the curved reflecting surfaces.

14. The sunlight modulation device according to claim 7, further comprising a driving element connected with the light deflection module to adjust the light deflection module in at least one manner of linear movement or rotation.

15. The sunlight modulation device according to claim 7, further comprising at least one of a filter element and a scattering element selectively moving to the focal region or adjacent to the focal region in linear movement or rotation manner.

16. The sunlight modulation device according to claim 7, wherein the light focusing module and the light deflection module are plural aligned with each other, and a solar panel is positioned next to one of the light deflection module and at a position of the neighbor target area, and wherein one back of the solar panel comprises a reflecting surface as a part of the light deflection module next thereto.

17. The sunlight modulation device according to claim 7, wherein the target area comprises a light entrance surface of at least one of a solar panel and a heating device.

18. The sunlight modulation device according to claim 7, wherein the converged direct sunlight of a first wavelength range is divergently deflected to the target area, and the converged direct sunlight of a second wavelength range transmits through the light deflection module.

19. The sunlight modulation device according to claim 7, wherein a setting position of the light deflection module is diverged from a physical center axis of the light focusing module.

* * * * *